United States Patent
Yuan et al.

(10) Patent No.: US 7,543,975 B2
(45) Date of Patent: Jun. 9, 2009

(54) OPTICAL FILM AND BACKLIGHT MODULE, DISPLAY DEVICE AND ELECTRO-OPTICAL DEVICE INCLUDING THEREOF

(75) Inventors: Shih-Wu Yuan, Hsin-Chu (TW); Chih-Liang Pan, Hsin-Chu (TW); I-Jan Wang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 129 days.

(21) Appl. No.: 11/753,757

(22) Filed: May 25, 2007

(65) Prior Publication Data

US 2008/0170416 A1 Jul. 17, 2008

(30) Foreign Application Priority Data

Jan. 16, 2007 (TW) .............................. 96101652 A

(51) Int. Cl.
*F21V 7/04* (2006.01)
(52) U.S. Cl. ........................................ 362/632; 349/62
(58) Field of Classification Search ................... 362/33, 362/97, 561, 617, 618, 632, 633, 634; 349/57, 349/58, 60, 62, 64
See application file for complete search history.

(56) References Cited

U.S. PATENT DOCUMENTS

| | | | |
|---|---|---|---|
| 6,835,961 B2 | 12/2004 | Fukayama | |
| 7,125,157 B2 * | 10/2006 | Fu et al. ..................... | 362/632 |
| 7,188,965 B2 * | 3/2007 | Chang et al. ............... | 362/97.4 |
| 7,197,227 B2 * | 3/2007 | Fan et al. ................... | 385/147 |
| 7,244,966 B2 * | 7/2007 | Fukayama .................. | 257/98 |
| 2003/0231499 A1 | 12/2003 | Kao | |
| 2005/0110920 A1 | 5/2005 | Harayama et al. | |

FOREIGN PATENT DOCUMENTS

| | | |
|---|---|---|
| CN | 2291138 | 9/1998 |
| TW | 444872 | 7/2001 |
| TW | 466360 | 12/2001 |
| TW | M247837 | 10/2004 |

(Continued)

OTHER PUBLICATIONS

English language translation of abstract and pertinent parts of CN 2291138.

(Continued)

*Primary Examiner*—Hargobind S Sawhney
(74) *Attorney, Agent, or Firm*—Thomas, Kayden, Horstemeyer & Risley

(57) ABSTRACT

A backlight module is provided. The backlight module includes a frame, a fixed structure and at least one optical film. The fixed structure includes a fixed part and a connected part connects to the surface and the fixed part. The width of the fixed part is substantially greater than the width of the connected part. The at least one optical film includes an accommodated part comprising a first portion and a second portion adjoins to the first portion. The width of the first portion is substantially greater than or substantially equal to the fixed part, and the width of the second portion is substantially greater than or substantially equal to the width of the connected part.

15 Claims, 10 Drawing Sheets

FOREIGN PATENT DOCUMENTS

TW    M256500     2/2005
TW    200702788   1/2007

OTHER PUBLICATIONS

English language translation of abstract of TW 466360.
English language translation of abstract of M247837.
English language translation of abstract of M256500.
English language translation of abstract of 444872.
English language translation of abstract of 200702788.

* cited by examiner

OPTICAL FILM AND BACKLIGHT MODULE, DISPLAY DEVICE AND ELECTRO-OPTICAL DEVICE INCLUDING THEREOF

RELATED APPLICATIONS

This application claims the benefits of Taiwan Application No. 96101652, filed Jan. 16, 2007, the contents of which are herein incorporated by reference in its.

BACKGROUND

1. Field of Invention

The present invention relates to an optical film and, more particularly, to an optical film of a backlight module, a display device, and an electro-optical device with the backlight module.

2. Description of Related Art

With progress of electro-optical technologies and the coming of digital times to cause the business of liquid crystal display (LCD) is flourishing. The LCD having the advantages of high quality of the image, small volume, light weight, low drive voltage, and low power consumption, LCD is broadly applied in consumer communication products or electronic products, such as personal digital assistants (PDAs), mobile phones, camcorders, notebooks, desktop computers, automobile displays, and projection televisions, and replaces cathode ray tube (CRT) to become the mainstream of displays.

LCD utilizes characteristics of liquid crystal to perform displaying. Comparing to the conventional CRT, LCD has more flexibility in size and weight. Therefore, LCD is commonly applied in various kinds of personal systems, e.g. mobile phone, PDAs, displays of digital cameras, televisions and billboards.

Presently, there is a trend for LCD to become lighter and thinner, especially when applied in mobile applications, e.g. notebooks, PDAs, and mobile phones. Meanwhile, it is an imperative to cost down of material and fabrication. However, there is a conflict/trade-off in LCD panels between the downscaling of weight and size, and the robustness of the structure.

FIG. 1 is an explosion diagram of a backlight module of a conventional LCD panel. As illustrated in FIG. 1, for reducing the weight and the size, the backlight module 10 of the conventional LCD panel usually includes a plastic frame 102, a lower diffuser 104, prism films 106 and 108, and an upper diffuser 110. There is a reflector (now shown) and a light tube (now shown) disposed on the plastic frame 102, and a light guide plate (now shown) disposed between the plastic frame 102 and the lower diffuser 104. The fixed position of the optical films, e.g. the lower diffuser 104, the prism films 106 and 108, and the upper diffuser 110, after the fabricated within the plastic frame 102, are important. If optical films are loosely fixed on the plastic frame 102, the loosely fixed films avoid strain and torsion coming from the expansion of films when the temperature varies but causes displacement of the optical films such that the uniformity illustrated on the LCD is loss. However, the optical films tightly fixed on the plastic frame 102 solves the problem of the displacement of the optical films but results in uneven expansion of the films when the temperature varies whatever also destroys the uniformity of the LCD. For the present LCD panel, for the fix of the positioning of the optical films, the adhesive tape 112 sticking on the plastic frame 102 is used and both of them are usually utilized to limit the motion directions of the optical films. The motion in the X-Y direction of the optical films is limited by the plastic frame 102, and the motion in the Z direction of the optical films is limited by the adhesive tape 112.

Referring to FIG. 2, FIG. 2 is a diagram illustrating the utilization of the adhesive tape to fix the optical films. Though the adhesive tape 112 may be utilized to fix the optical films, after a period of time, the decreasing adhesion of adhesive tape 112 may causes the degradation of the positioning of the optical films. FIG. 3A and FIG. 3B illustrate the problems of positioning the optical films by the adhesive tape in the traditional of the position of the optical films. Referring to FIG. 3A, the adhesive tape 112 is not well fixed, such that the optical film 114 is loosed from the recess of the plastic frame 102 and the malposition of the optical films 114 is happened. The dotted line indicates a normal position of the optical film 114 when the optical film 114 does not come off, and the optical film 114 is still fastened within the plastic frame 102. Referring to FIG. 3B, the adhesive tape 112 drops from the plastic frame 102, causing the optical film 114 coming off the plastic frame 102 and displacement. The dotted line 114 indicates a normal position of the optical film 114 when the optical film 114 is fastened within the plastic frame 102. The two situations illustrated in FIGS. 3A and 3B bring defects in the appearance of LCD panel.

Moreover, it is necessary to replace the adhesive tape whenever the product is reworked. It is absolutely a burden to both the fabrication time and the cost of materials.

SUMMARY

Therefore, it is provided by the present invention an optical film that comprises a body and an accommodation part. The accommodated part is connected to the body, and includes a first portion and a second portion adjoining the first portion. The width of the first portion is substantially greater than the width of the second portion.

It is provided by the present invention a backlight module comprises a frame, a fixed structure located on a surface of the frame, and at least one optical film. The fixed structure includes a fixed part and a connected part connects to the surface and the fixed part. The width of the fixed part is substantially greater than the width of the connected part. The optical film includes an accommodated part. The accommodated part has a first portion and a second portion adjoining the first portion. The width of the first portion is substantially greater than or substantially equal to the width of the fixed part, and the width of the second portion is substantially greater than or substantially equal to the width of the connected part.

It is further provided by the present invention a display device incorporating the above-mentioned backlight module, and an electro-optical device that incorporating said display device.

The present invention of the backlight module is able to improve the fixed of the optical films of the backlight module. It further provides more degree of freedom for the optical films in thermal expansion. The advantages of the backlight module further include decreasing the use of the adhesive material cause the cost-down as well as reducing failure ratio of the manufacture and reworked ratio of the backlight module. Furthermore, the backlight module avoids the problem of material mixing and other problems induced by degumming of the adhesive tape.

In order to the make aforementioned and other objects, features and advantages of the present invention comprehensible, preferred embodiments accompanied with figures are described in detail below.

BRIEF DESCRIPTION OF THE DRAWINGS

The present invention will become more fully understood from the detailed description given herein below and the accompanying drawings, given by way of illustration only and thus not intended to be limitative of the present invention.

DESCRIPTION OF THE PREFERRED EMBODIMENTS

The following description is of the best-contemplated mode of carrying out the present invention. This description is made for the purpose of illustrating the general principles of the present invention and should not be taken in a limiting concept. The scope of the present invention is best determined by reference to the appended claims.

It is introduced by the present invention a fixed structure of an optical film incorporating the backlight module. The fixed structure is able to fix the optical film on a frame of the backlight module.

Figure 1:
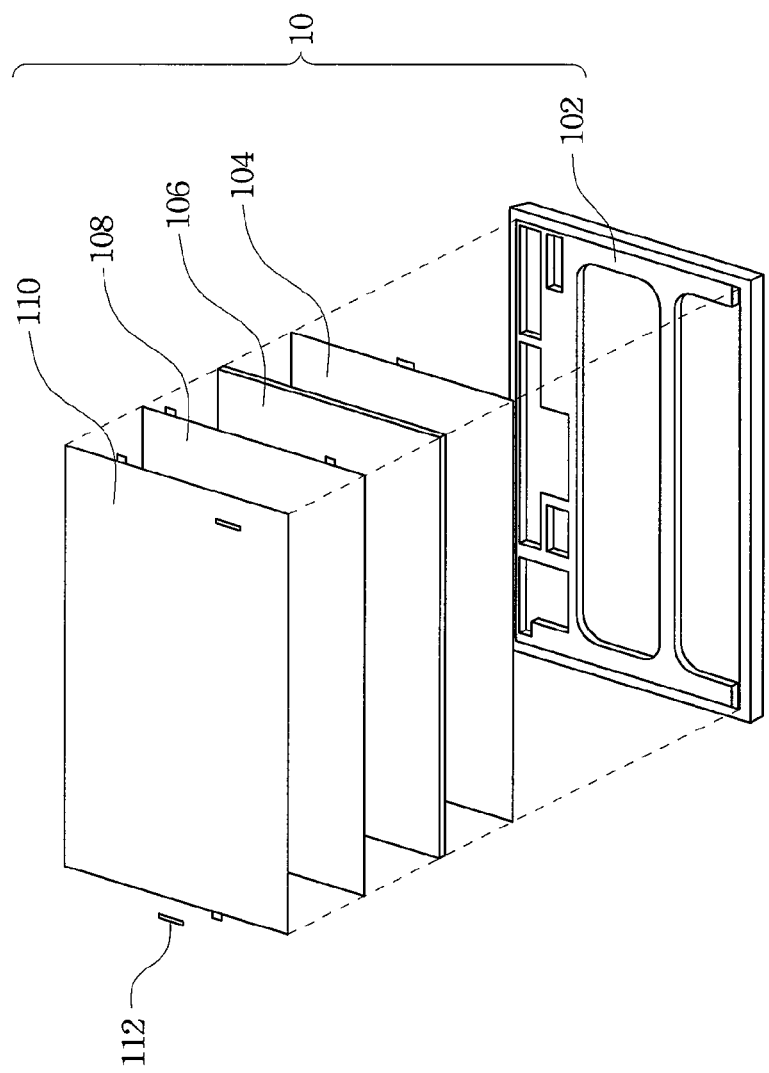
FIG. 1 is an explosion diagram of a backlight module of a conventional LCD panel.
Figure 2:
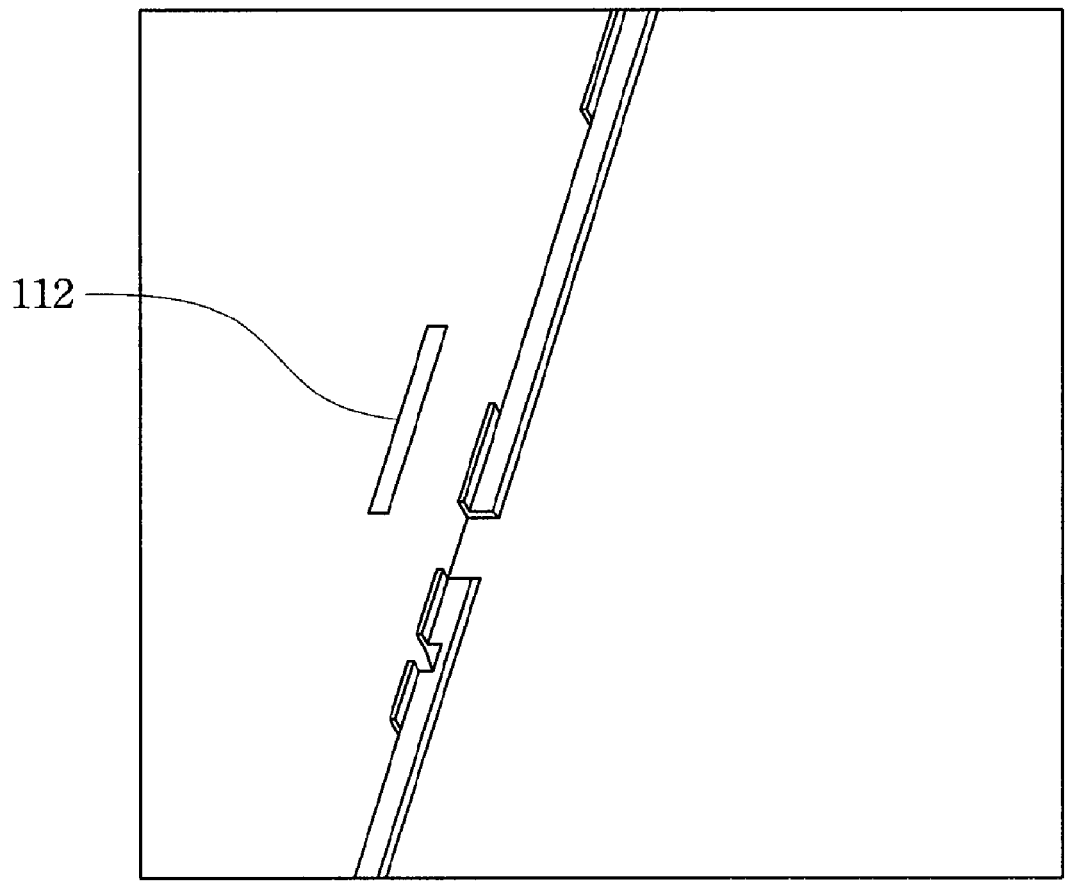
FIG. 2 is a diagram illustrating the utilization of the adhesive tape to fasten the optical films.
Figure 3A:
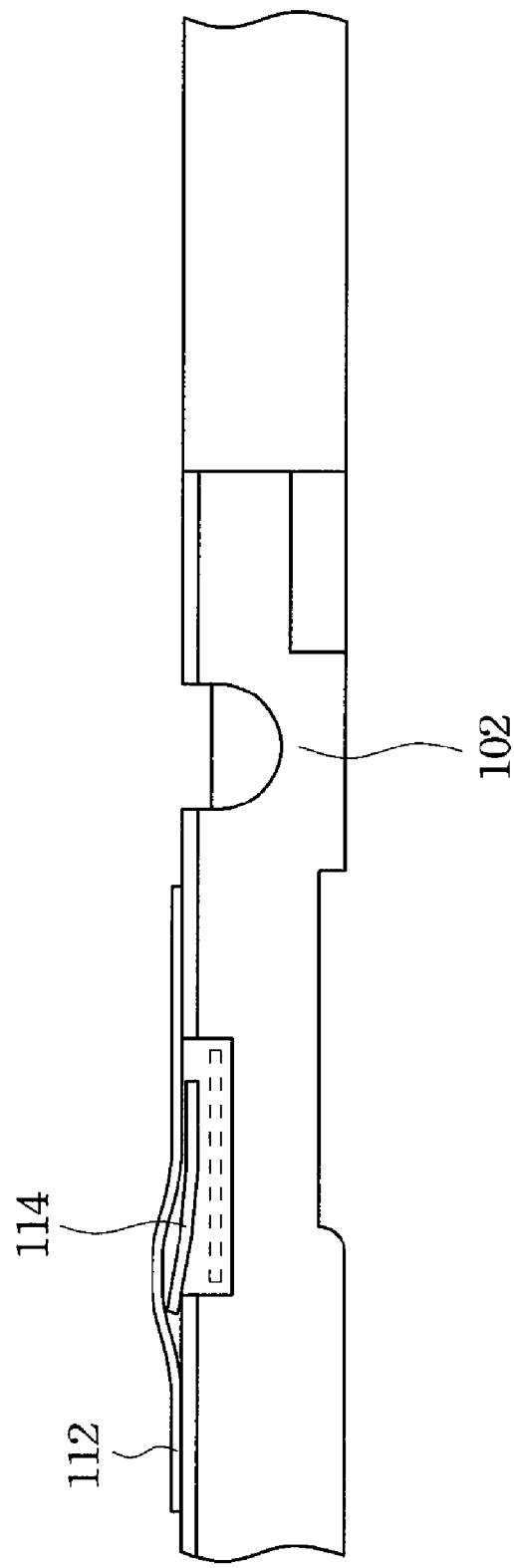
FIG. 3A and FIG. 3B are diagrams displaying the loosed optical films.
Figure 3B:
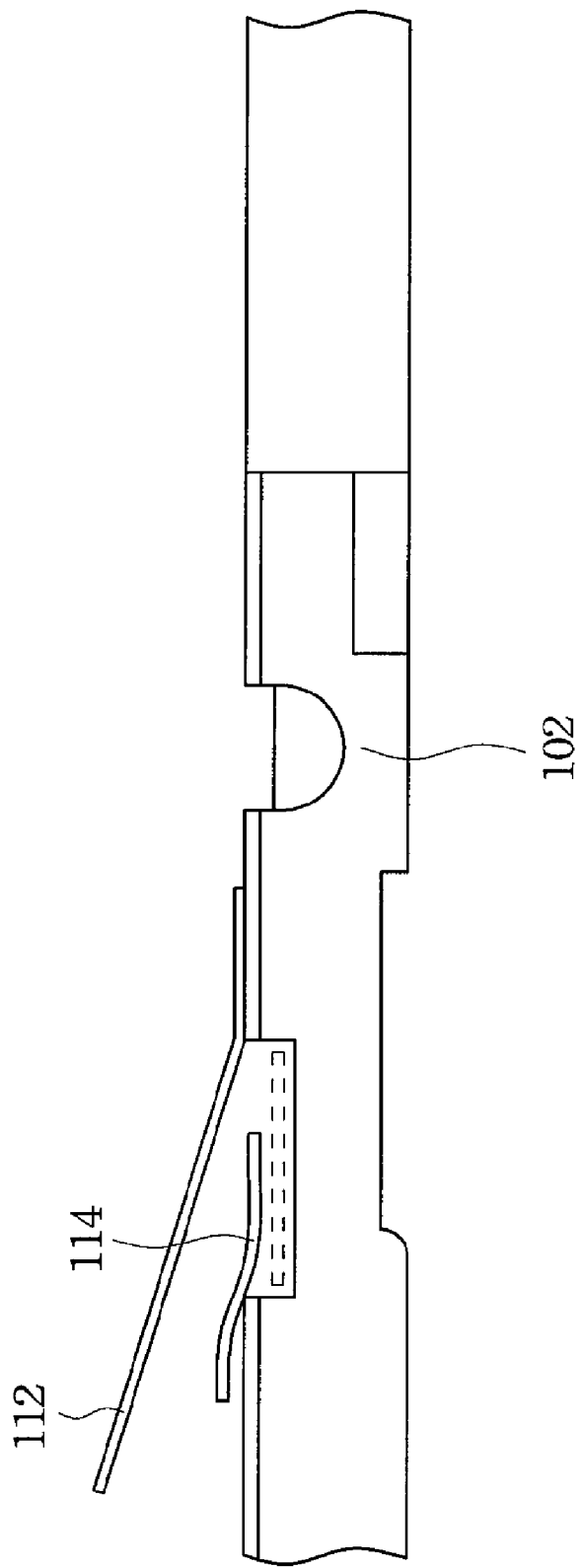
Figure 4:
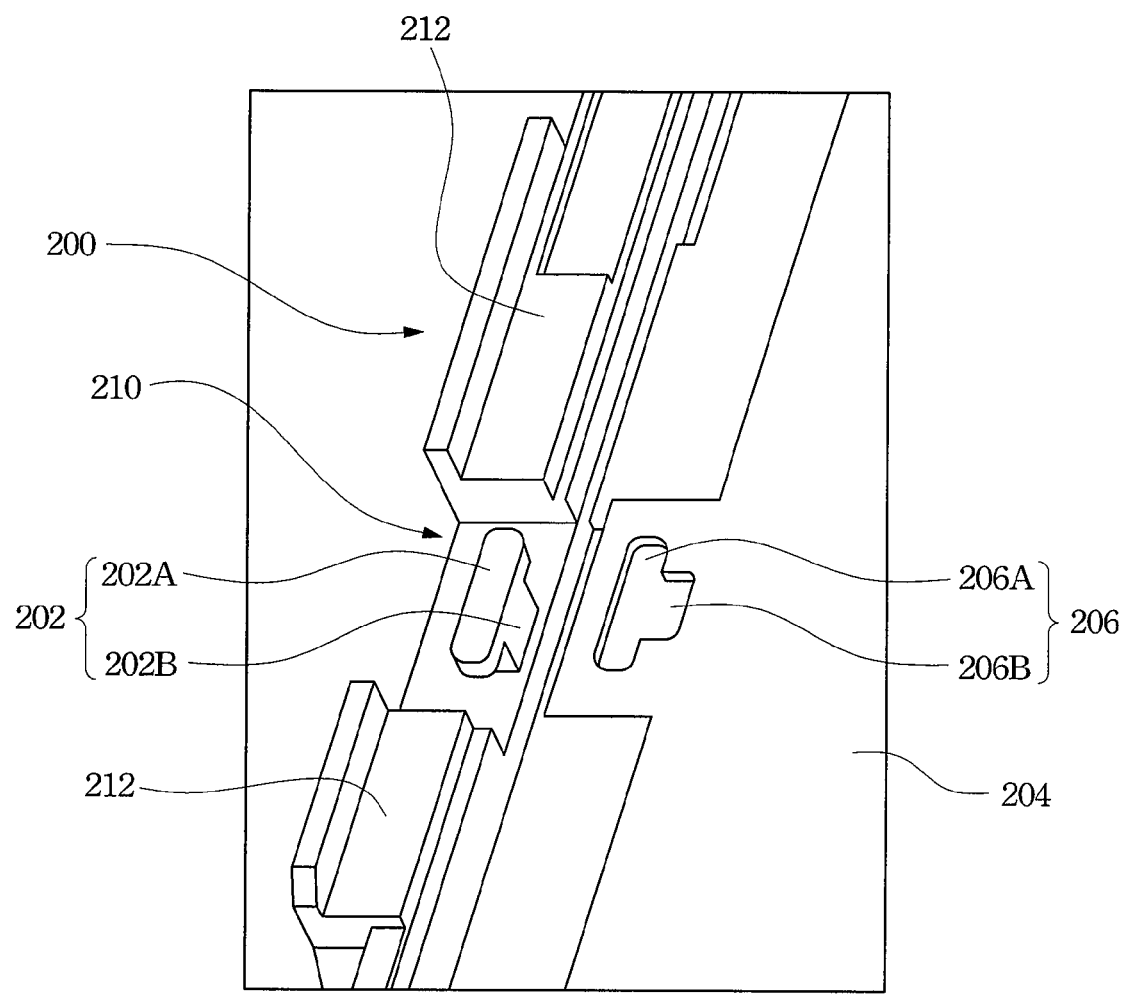
FIG. 4 is a diagram of a first embodiment of the present invention.

Referring to FIG. 4 illustrates a diagram of a first embodiment of the present invention. There is a fixed structure 202 on a top surface at a side of the frame 200. The fixed structure 202 includes a fixed part 202A and a connected part 202B connecting the surface at the side of the frame 200 and is the fixed part 202A. Preferred, the width of the fixed part 202A is substantially greater than the width of the connected part 202B. The connected part 202B of the fixed structure 202 is preferably but not limited to couple to a substantially center region of the fixed part 202A. For example, the connected part 202B can couple to a place is substantially strayed from the center region of the fixed part 202A, an end is substantially away from the center region of the fixed part 202A (not shown), or can be located at other position. A shape of the fixed part 202A in a top view may preferably but not necessarily be an substantially ellipse. The shape of the fixed part 202A in a top view may otherwise be a shape of "substantially C", a substantially round, a substantially triangle, a substantially polygon, or other shapes. A connected part 202B may be a column or pillar, in where a top view of the connected part 202B may preferably but not necessarily include a substantially semi-ellipse or a substantially semi-circle. The shape of the connected part 202B in a top view may otherwise include a substantially triangle, a substantially trapezoidal, a substantially polygon, or other shapes. The surface of the side of the frame 200, in where the fixed structure 202 is installed at the side, is preferably substantially scraggy. The fixed structure 202 is preferably located in an indentation part 210 of the surface of the frame 200, or may be on a border of an indentation part and a protrusion part of the frame 200, in a protrusion part, or at other location of the frame 200. The frame 200 includes at least one protruding edge 212 located at another side of the frame 200, in where said side is away from the fixed structure 202. In other words, the protruding edges are located at a side of an accommodated part away from the frame. The at least one protruding edge 212, is capable of providing an obstruction for an optical film 204 when installing the optical film 204 on the frame 200. The indentation part 210 is preferably but not necessarily formed by two adjacent protruding edges 212, such that the fixed structure 202 is located between the two protruding edges 212. However, the indentation part 210 can alternately be next to only one protruding edge 212.

There is at least one optical film 204 disposed on the frame 200. The optical film 204 includes an accommodated part 206, for example, a hole. The accommodated part 206 may be an opening, wherein the shape of the opening is a wide-to-narrow opening in the present embodiment, i.e. a substantially T-shape opening. The accommodated part 206 may otherwise include an substantially L-shape opening, a substantially C-shape opening, or an opening of other shapes. The accommodated part 206, in this embodiment, includes a first portion 206A and a second portion 206B. The first portion 206A and the second portion 206B are connected to each other. The width of first portion 206A is substantially greater than or substantially equal to the width of the fixed part 202A, and the width of second portion 206B is substantially greater than or substantially equal to the width of the connected part 202B. In other words, a width of the second portion 206B is substantially between a width of the connected part 202B and a width of the first portion 206A. And, in other words, the top-view shape of the first portion 206A is corresponding to the top-view shape of the fixed part 202A and/or the top-view shape of the second portion 206B is corresponding to the top-view shape of the connected part 202B. The frame 200 may be also called a bottom frame, a bottom case, or a bottom container, and the material of the frame 200 includes plastic (e.g. thermosetting material, thermoplastic, or combinations thereof), metal (e.g. aluminum, magnesium, copper, iron, tin, zinc, others, or combinations thereof), alloy (e.g. oxides, nitrides, nitrogen oxides, aluminum, magnesium, copper, iron, tin, or zinc, other compounds, or combinations thereof), or combinations thereof. Depending on the different necessary functions of the back light module, the optical film 204 includes optical films such as diffusers, diffusing plate, optical guide film, prism film, brightness enhancement film (BEF), polarizers, wave-length selecting film, light transflective film, or other functions of the optical film, or combinations thereof.

Figure 5:
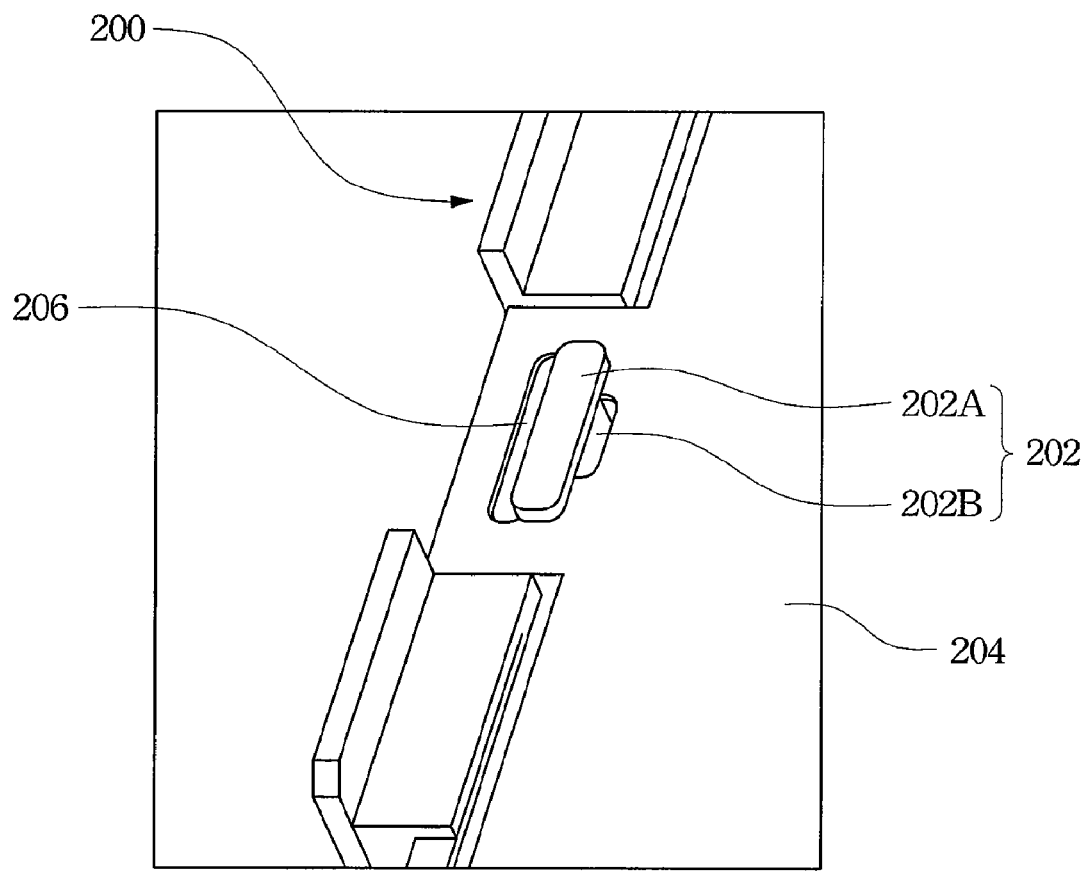
FIG. 5 is a diagram of an optical film disposed on the frame.
Figure 6:
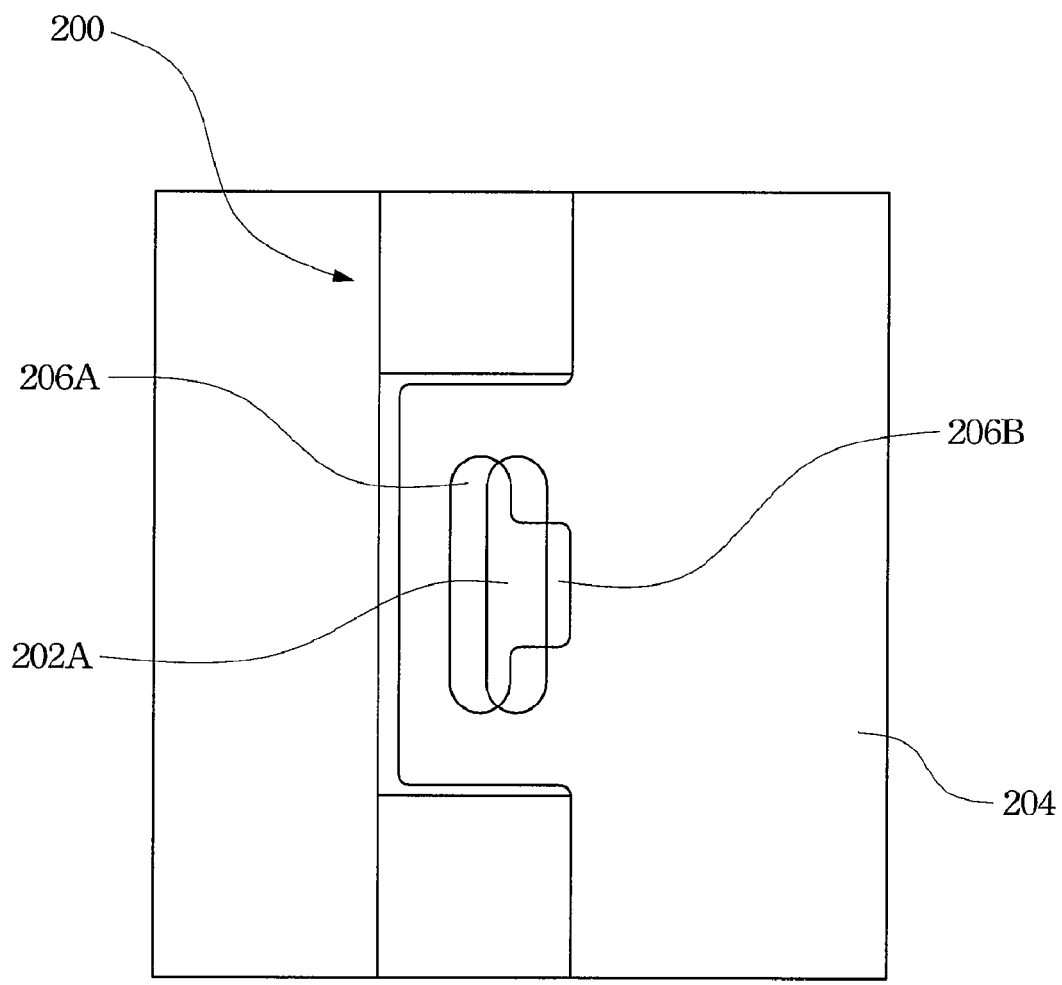
FIG. 6 is a top view of the optical film disposed on the frame illustrated in FIG. 5.

Referring to FIG. 5 and FIG. 6 are is a diagram of an optical film installed on the frame in FIG. 5 and a top view of FIG. 5 in FIG. 6. When installing the optical film 204 on the frame 200, the fixed structure of the present embodiment utilizes a fixed part to join the frame 200 and the optical film 204. First, a side (not shown) of the optical film 204 is inserted in to a recess (not shown) at a side of the frame 200. Next, the first portion 206A of the accommodated part 206 is passed through the fixed part 202A, and the optical film 204 is moved along a predetermined direction (not shown) such that the second portion 206B of the accommodated part 206 accommodates to the connected part 202B. The vertical motion of the optical film 204, i.e. the motion along the direction Z, is limited by the fixed part 202A. The motion of the optical film 204 along the direction X is limited by the obstruction between the side of the optical film 204 and the protruding edge 212 on the frame 200. The motion of the optical film 204 along the direction Y is limited by the obstruction between the protruding edge 212 on the frame 200 and the side of the optical film 204 when the accommodated part 206 of the optical film 204 is located at the indentation part 210.

The fixed structure 202 in the present embodiment is substantially of a shape T exemplarily but not necessarily. In fixing the optical films, the fixed structure 202 disclosed in the embodiment of the present invention can effectively fixed the optical films in directions X, Y and Z. The space is reserved to avoid the deformation of the optical films due to thermal expansion. The present invention improves the positioning of the optical films in the backlight module. The optical film and the frame are fixed to join each other, and then, preferred, its no additional element is required to fix the optical film and the frame in the present inventions.

Figure 7:
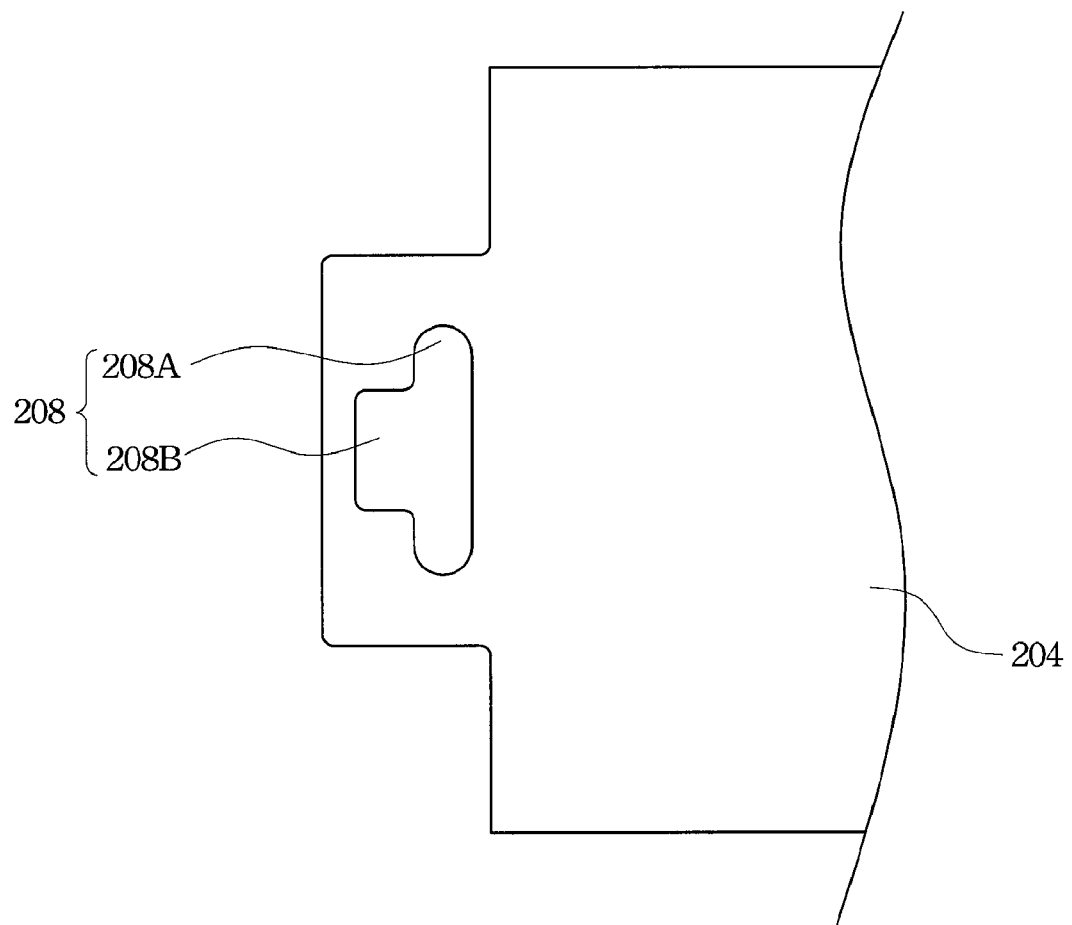
FIG. 7 is a diagram of an optical film according to a second embodiment of the present invention.

In second embodiment, as illustrated in FIG. 7, in an accommodated part 208 of the optical film 204. The optical film having a body (not shown) and the accommodated part connects to the body. The accommodated parted 208 has the first portion 208A and the second portion 208B to form a shape of substantially inverse T or other shapes. In other words, the first portion 208A is adjacent to the body and the second portion 208B is away from the base. Besides, the fixed part 202A and the connected part 202B of the fixed structure 202 are not limited to the structures shown in FIG. 4 and FIG. 5. For the fixed structure of the present invention, the width of the fixed part is substantially greater than the width of the connected part. Hence after passing through the fixed part, the first portion of the accommodated part of the optical film may push the optical film along a predetermined direction, such that the second portion of the accommodated part is accommodate the connected part. Limited by the fixed part, the optical film is fixed in the vertical direction. The shapes of the fixed part and the connected part of the fixed structure are not limited to the shapes shown in FIG. 4 and FIG. 5. Furthermore, the fixed structure illustrated in the drawings above is symmetric exemplarily but not necessarily. In other words, in a symmetric fixed structure, the widths and/or the shapes of the two parts of the fixed part, separated by the connected part, are identical. On the contrary, in an asymmetric fixed structure, the widths and/or the shapes of the two parts of the fixed part, separated by the connected part, are different to each other.

The light source of the present backlight module includes fluorescent tubes, light emitting diodes (LEDs), a field emitting light (FEL), a plasma emitting light, an organic electroluminescence light (OEL), etc. The fluorescent tubes may include a cold cathode fluorescence lamp (CCFL), an electrode fluorescent lamp (EEFL), and a hot cathode fluorescent lamp (HCFL). The shapes of the fluorescent tubes include a line, a substantially L-shape, a substantially U-shape, a substantially curve, or other shapes. The OEL includes an organic electro-luminescence device (OELD) and/or a polymer electro-luminescence device (PLED).

Figure 8:
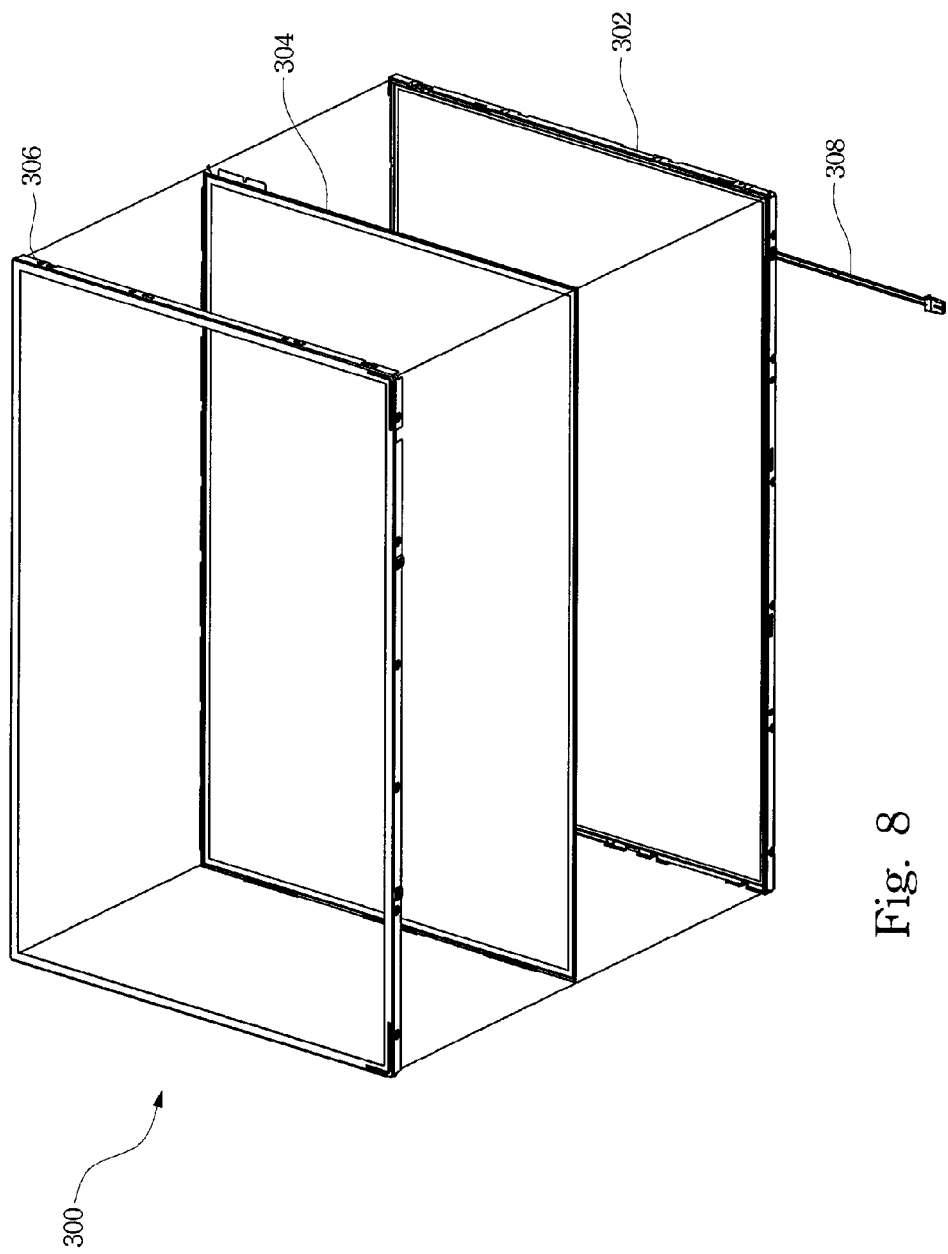
FIG. 8 is an explosion diagram of a display device comprising the backlight module of the present invention.

FIG. 8 illustrates an explosion diagram of a display device comprising the backlight module of the present invention. The display device 300 includes a backlight module 302, a panel 304, and an upper frame 306. The backlight module 302 includes a power line 308 is adapted to provide an operation voltage or an operation current to the light source of the backlight module 302. As illustrated in FIG. 8, the upper frame 306 and the backlight module 302 are joined to hold the panel 304 therein to form the display device 300. Please note that, a display device 300 having at least one panel is taken as the example to illustrate the display device 300. The display device 300 may further have two or more panels. The panel 304 is a liquid display panel, including a transmissive panel, a semi-transmissive panel, a reflective panel, a dual panel, a vertical alignment (VA) panel, an in-plane switching (IPS) panel, a multi-domain vertical alignment (MVA) panel, a twist nematic (TN) panel, a super twist nematic (STN) panel, a patterned vertical alignment (PVA) panel, a super patterned vertical alignment (S-PVA) panel, an annotation scalable view (ASV) panel, a fringe field switch (FFS) panel, a continuous pinwheel alignment (CPA) panel, an axisymmetric micro-cell (ASM) panel, an optical compensated birefringence (OCB) panel, a super in-plane switching (S-IPS) panel, an advanced super in-plane switching (AS-IPS) panel, an ultimate fringe field switch (UFFS) panel, a polymer stable alignment panel (PSA), a dual-view panel, a triple-view panel, three dimensions display panel, other types of panels, or combinations thereof.

Figure 9:
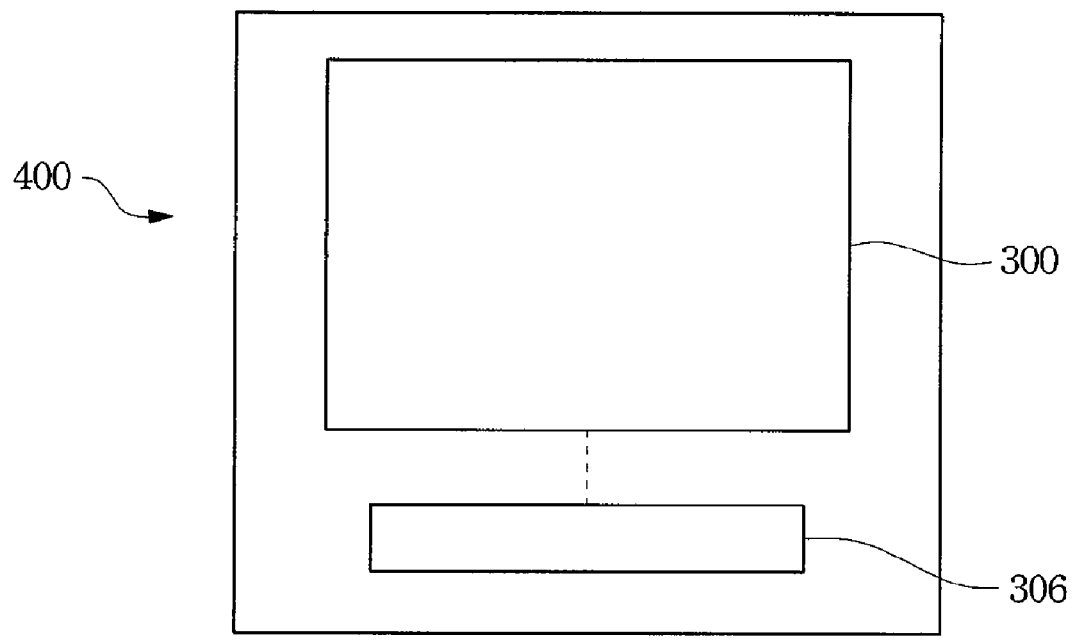
FIG. 9 is a diagram of an electro-optical device comprising the display device of the present invention.

FIG. 9 illustrates a diagram of an electro-optical device comprising the display device described above. The display device 300 of the present embodiment can be coupled to the electronic device 306 to form an electro-optical device 400. The electronic device 400 may include a controller, an operator, a processor, an input device, a memory, a driver, a protecting device, a sensor, a detector, device of other functions, or combinations thereof. The electro-optical device may include a mobile device (e.g. a mobile phone, a camera, a recorder, a notebook, a play station, a watch, an audio player, an emailing device, electronic image frame, map leading device, or others), an audio video device (e.g. a video player, or the like), a monitor, a television, a commercial billboard (e.g. outer door, inter door, or combinations thereof), an internal panel of a projector, etc.

In summary, in the present backlight module, the fixed result of the optical films of the backlight module can be improved. More degree of freedom for the optical films in thermal expansion is further provided. Besides, the decreasing the use of the adhesive material causes the cost-down, the yield of the manufacture and reworking of the backlight module increase, and the problem of material mixing and the problem induced by degumming of the adhesive tape are relieved.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a frame;
   a fixed structure, located on a surface of the frame, and having a fixed part and a connected part connected to the surface and the fixed part, wherein the width of the fixed part is substantially greater than the width of the connected part; and
   at least one optical film, disposed on the frame, and comprising an accommodated part with a first portion and a second portion adjoining the first portion, wherein the accommodated part passes through the fixed structure, and the width of the first portion is substantially greater than or substantially equal to the width of the fixed part and the width of the second portion is substantially greater than or substantially equal to the width of the connected part.

2. The module of claim 1, wherein the surface of the frame is substantially scraggy.

3. The module of claim 2, wherein the fixed structure is located in an indentation part of the surface of the frame.

4. The module of claim 1, wherein the frame includes a plurality of protruding edges, in which the protruding edges are located at one side of an accommodated part away from the frame.

5. The module of claim 4, wherein the fixed structure is located between the two adjacent protruding edges.

6. The module of claim 1, wherein the connected part connects to a substantially center region of the fixed part.

7. The module of claim 1, wherein the top-view shaped of the fixed part comprises a substantially elliptic shaped.

8. The module of claim 1, wherein the top-view shaped of the connected portion comprises a substantially pillar shaped.

9. The module of claim 1, wherein the width of the second portion is substantially between the width of the connected part and the width of the first portion.

10. A display device, comprising the backlight module of claim 1.

11. A method for manufacturing the backlight module of claim 1, comprising:
   placing the first portion of the optical film into the fixed part of the fixed structure such that the first portion passes through the fixed part and the connected part; and
   moving the optical film toward a predetermined direction such that the second portion of the optical film accommodates the connected part of the fixed structure.

12. An electro-optical device incorporating the display device of claim 11.

13. A method for manufacturing a display device incorporating the method of the backlight module of claim 11.

14. A method for manufacturing an electro-optical device incorporating the manufacturing method of the display device of claim 13.

15. An electro-optical device incorporating the backlight module of claim 1.

* * * * *